(12) United States Patent
Klawinski (10) Patent No.: US 10,568,278 B1
(45) Date of Patent: Feb. 25, 2020

(54) PIVOT CONTROLLER

(71) Applicant: Brian Peter Klawinski, Magnolia, TX (US)

(72) Inventor: Brian Peter Klawinski, Magnolia, TX (US)

( * ) Notice: Subject to any disclaimer, the term of this patent is extended or adjusted under 35 U.S.C. 154(b) by 379 days.

(21) Appl. No.: 15/601,043

(22) Filed: May 22, 2017

(51) Int. Cl.
*A01G 25/09* (2006.01)
*A01G 25/16* (2006.01)
*G06F 11/07* (2006.01)

(52) U.S. Cl.
CPC ......... *A01G 25/092* (2013.01); *A01G 25/162* (2013.01); *A01G 25/165* (2013.01); *G06F 11/0703* (2013.01); *G06F 11/0796* (2013.01)

(58) Field of Classification Search
CPC .. A01G 25/092; A01G 25/162; A01G 25/165; G06F 11/0703; G01R 31/3278
See application file for complete search history.

(56) References Cited

U.S. PATENT DOCUMENTS

2008/0089000 A1* 4/2008 Drake et al. ....... G01R 31/3278
  361/195
2011/0304222 A1* 12/2011 Pickerill .............. A01G 25/092
  307/112

\* cited by examiner

*Primary Examiner* — Scott Bauer (57) ABSTRACT

An improved pivot controller is described that solves existing deficiencies in pivot controllers. Specifically, a pivot controller that can interface with either a hot or neutral safety, detect failed contactors and relays, and verify the safety control circuit is described. The described improved pivot controller permits easier installation, safer operation, and faster diagnostics than existing pivot controllers.

2 Claims, 6 Drawing Sheets

PIVOT CONTROLLER

BACKGROUND OF THE INVENTION

1. Field of the Invention

The present invention relates generally to the field of agricultural equipment, and particularly to pivot controllers for center pivots.

2. Description of the Related Art

Center pivots are commonly used to irrigate large areas of land that are typically a half mile on each side or quarter section. The center pivot includes a base that is attached to the ground and number of segments attached together that are supported on wheels for allowing them to rotate around the base.

While the pivot controller can be mechanical or computerized, both types operate with a similar set of inputs and outputs. The basic control signals from a pivot controller are the forward and reverse direction lines, end gun control, and speed control. The control lines typically are connected to contactors at the various towers in the system to turn on and off three-phase power to motors or other equipment.

Center pivots also implement a safety circuit that can stop the system if a tower moves out-of-line from the other towers. If the safety circuit is broken, then the system will stop. There are multiple methods of implementing a safety control system in a center pivot, but each uses the same concept of running a signal wire through a switch at each tower and if the tower moves out-of-line then the control signal is broken.

A safety circuit is either a hot safety or a neutral safety. In a hot safety, the safety circuit typically has line voltage and is monitored by an optocoupler or a relay. Hot safety circuits can be one-wire or two-wire. A two-wire system has a dedicated wire leaving the panel that travels to the end tower where the safety return heads back to the system panel. In a one-wire safety, the safety signal is obtained from connecting to one of the other control signals at the end tower. The signals can be the forward or reverse control wires, or even the neutral line.

When replacement equipment is installed on a center pivot, it is designed to work with either a hot-safety or a neutral-safety. If the installed safety circuit does not match the new equipment, then the safety control circuit must be re-wired. Rewiring the safety circuit can be time consuming and lead to unexpected failures if the system was not designed to operate with the new safety circuit. Therefore, there exists a need for a pivot controller that can be installed with either a hot safety or neutral safety without a need to make any changes to the center pivot safety circuit.

The harsh environment that center pivots operate leads to unexpected results and costly damage. For instance, in some systems, the safety circuit may become bypassed from moisture penetration or component failure causing the system to operate when it should shutdown. In other situations, a contactor may fail in a tower and cause the pivot to stop, but the operator has no means to know where the failure occurred and must check the entire system. Therefore, there exists a need for a pivot control that can detect a failed safety circuit and other failed components in the system.

BRIEF DESCRIPTION OF THE DRAWINGS

This invention is described in a preferred embodiment in the following description with reference to the drawings, in which like numbers represent the same or similar elements, as follows.

In the following detailed description of exemplary embodiments of the invention, reference is made to the accompanying drawings, which form a part hereof, and in which is shown by way of illustration specific exemplary embodiments in which the invention may be practiced.

DETAILED DESCRIPTION OF PREFERRED EMBODIMENTS

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

When referring to the location of a center pivot, the location is the position of the end tower of the center pivot or the farthest most extension of the pivot pipe away from the pivot base.

The location of a center pivot is obtained with a position sensor. While referring to GPS coordinates and devices in conjunction with the figures, those familiar with the art will recognize that other types of position sensors may be utilized. For instance, an encoder type position sensor may be utilized to calculate the location of a center pivot.

A processor refers to a single computation device or multiple computational devices working together.

In the context of this application, a center pivot shall be interpreted to include a lateral pivot since the present invention is equally applicable to both.

Figure 1:
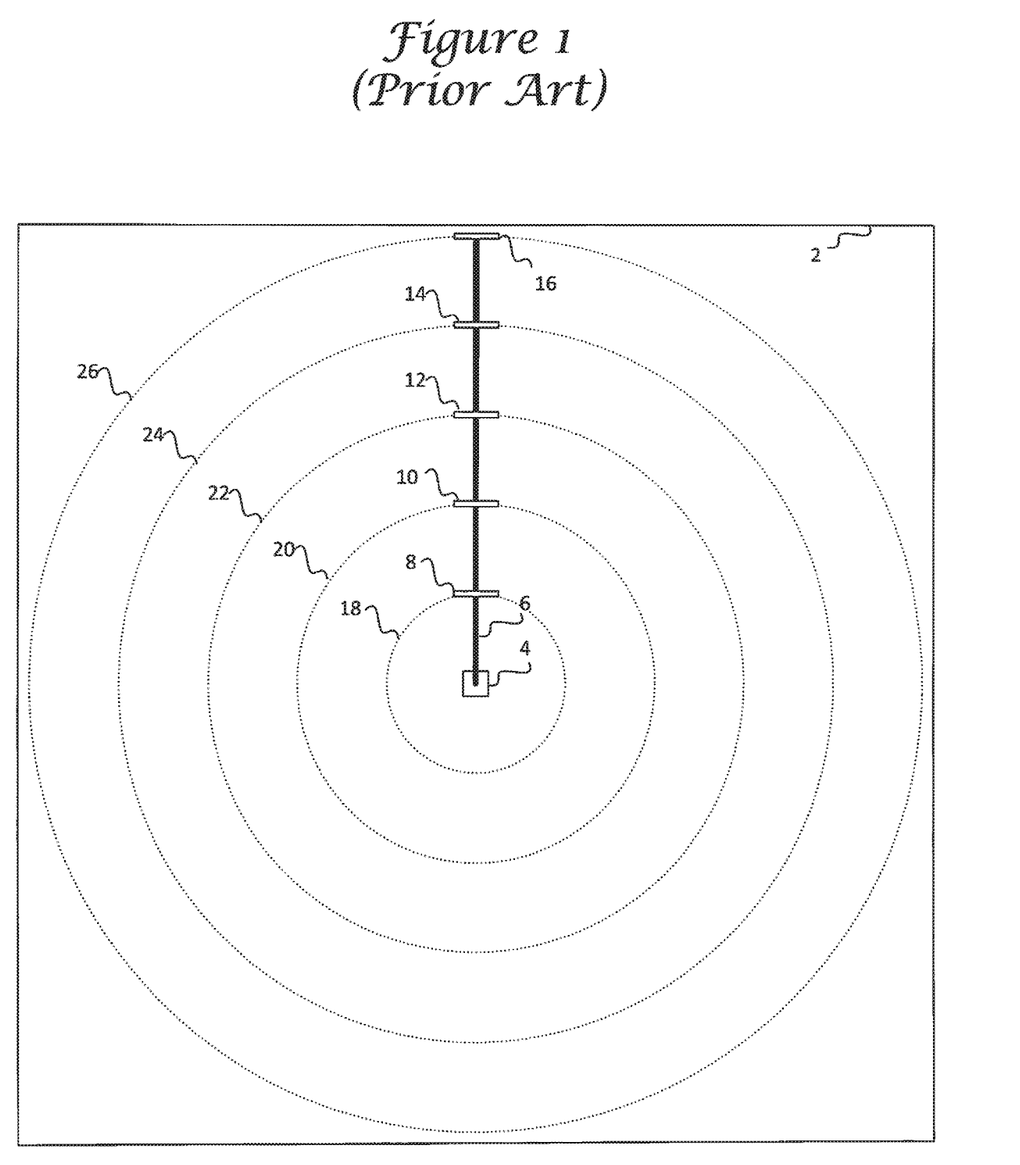
FIG. 1 is a generalized schematic of a prior art center pivot.

With reference now to the figures, and in particular with reference to FIG. 1, there is shown an overhead schematic of a center pivot. Center Pivot Base 4 is located near the center of Growing Field 2. The common size of a growing field is one half mile by one half mile; however, the size of a growing field may vary widely. Center Pivot Base 4 is attached to the ground and includes a rotation mechanism (not shown) that connects to Pivot Pipe 6.

Pivot Pipe 6 is supported by Intermediate Tower 8, 10, 12, and 14. Intermediate Towers 8, 10, 12, and 14 include wheels for allowing tangential movement with respect to Center Pivot Base 4. Paths 18, 20, 22, and 24 show the travel path of Intermediate Towers 8, 10, 12, and 14, respectively, as they travel around Growing Field 2. Intermediate Towers 8, 10, 12, and 14 may travel in either clockwise or counter-clockwise direction. Those familiar with the art common refer to clockwise direction as travelling forward and counter-clockwise as travelling in reverse.

Pivot Pipe 6 terminates at End. Tower 16. End Tower 16 is similar to Intermediate Towers 8, 10, 12, and 14. In some instances, End Tower 16 may extend Pivot Pipe 6 to further without any additional ground support and include an end gun (not shown) for watering the corners of Growing Field 2.

Figure 2:
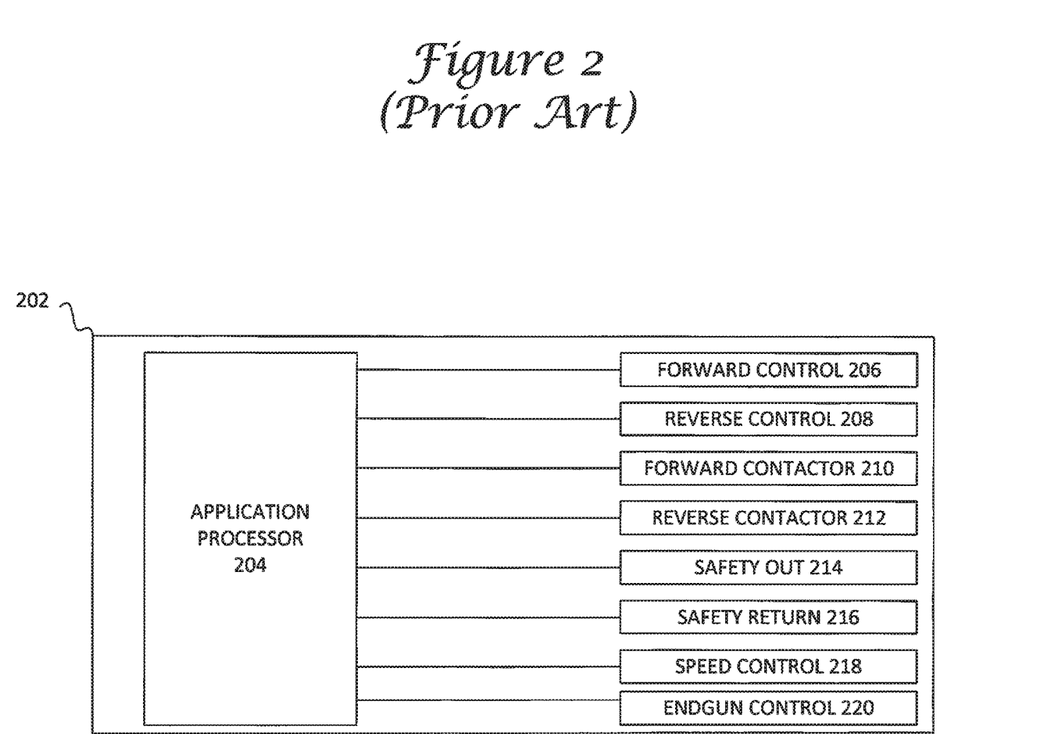
FIG. 2 illustrates the prior art electrical schematic for implementing center pivot speed control with a pivot monitor.

With referenced now to FIG. 2, a block diagram of a prior art computerized pivot controller is illustrated. Pivot Base 4 comprises an electrical panel 202 with application processor 204. Application processor 204 contains the logic instructions necessary to execute the various operations of the pivot.

The prior art pivot controller application processor 204 contains a means for activating forward control 206 and forward contactor 210 when the machine is set to move in the forward direction. Similarly, application processor 204 contains a means for activating reverse control 208 and reverse contactor 212 when the machine is set to move in the reverse direction.

While not depicted, prior art pivot controllers have a variety of means for user interfaces. User interfaces may be an touch screen, mechanical buttons, indicator lights, or combination thereof.

The control signals for selecting the direction are often implemented with relays. These relays may fail in either an open or closed state. If the control relay fails in a closed state, the system may operate in a dangerous manner. Prior art systems sometimes employ expensive, specially-designed relays to minimize the possibility of damage being caused by a failed relay. The use of such relays increases the cost of systems.

Speed control 218 is activated by application processor 204 to energize a contactor in last tower 16 to cause the last tower 16 to move in the selected direction. Typically, speed control 218 is engaged for a specified percentage of a minute to control the speed at which the machine moves around the field. By controlling the movement of last tower 16, the operator can control the amount of water being applied to the crop underneath.

End gun control 220 is activated by application processor 204 in areas of the field where the operator specifies. In a typical scenario, end gun control 220 would be active in the corners of the field and turned off in other areas to reduce watering outside of the field and on nearby roads.

The safety circuit of the system comprises of safety out 214 and safety return 216. Those familiar with the art will readily acknowledge that the safety can also be implemented without safety out 214 by a variety of means, including an isolation relay at end tower 16. Application processor monitors safety return 216 and if the safety is lost for a specified period of time the system is halted.

Towers 8, 10, 12, and 14 contain a switch that interrupts safety return 216 if any of the towers move out-of-line. A tower may become out-of-line for a variety of reasons, including a flat tire, being stuck in mud, bad contactor, or other mechanical failure. If a center pivot moves too far out-of-line serious damage may result to the machine and the crop underneath. It is therefore imperative that any pivot controller stop the machine to avoid unnecessary crop and financial loss.

Safety return 216 may be connected to application processor 204 by using an optocoupler or a relay. Prior art center pivot safety circuits have no means of verifying if the safety return signal is the result of a valid safety or an unexpected short or fault in the system. Those familiar with the art of center pivots recognize that water penetration, failed switches, and human error can lead to safety return 216 being present when the system is not safe to operate.

Safety return 216 may be either a hot or neutral safety depending on the manufacturer of a system. No system wiring implements both a hot and neutral safety since that would be unnecessarily redundant. A neutral safety system will accept the presence of neutral at safety return 216 and a hot safety will accept the presence of line voltage. If the required reference is present at safety return 216, then application processor 204 can safely engage the system.

The difference in safety types has implications for new pivot controllers. If a new control system is installed the safety circuit wiring for the center pivot must be changed to match the safety type of the new hardware. For instance, if a pivot controller that accepts a hot safety return is installed on a neutral safety pivot system, the pivot system will have to be rewired to be a hot safety. The rewiring of a safety circuit is time consuming and may lead to unexpected system failures. The present invention solves this problem by accepting either a hot or neutral safety return signal as is described in conjunction with FIG. 3.

Further, one skilled in the art will readily acknowledge the center pivot system depicted in FIG. 2 is undesirable because there is no means to verify the safety circuit, no means to detect failed control aspects, and no means to detect and identify a failed run relay before the system becomes unsafe to operate.

Figure 3:
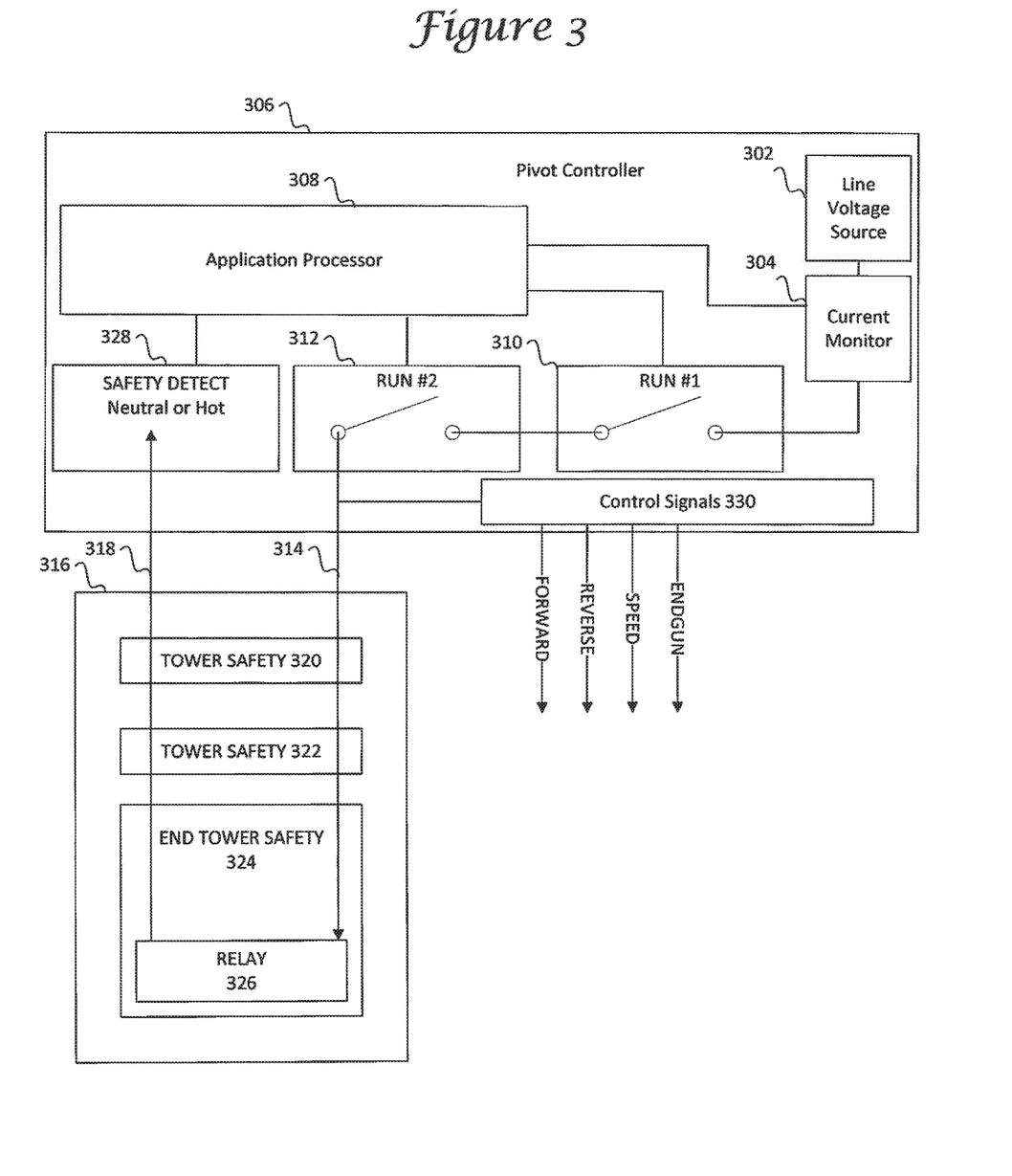
FIG. 3 depicts a block diagram for a center pivot controller in accordance with the present invention.

With referenced now to FIG. 3, a block diagram for center pivot controller in accordance with the present invention is shown. The present invention solves the shortcomings of the prior art because it can verify the safety circuit, accept either a hot or neutral safety return, detects and identifies a failed run relay and monitors current on control circuits to detected failed contactors and relays.

Application processor 308 includes the instructions for implementing the logic required to operate the pivot. Further, application processor 308 includes settings required to support the current system type that pivot control 306 is installed on, including the system safety type.

Pivot controller 306 comprises line voltage source 302 that is used to power control circuits. Additionally, pivot controller 306 includes current monitor 304 that is utilized to monitor the system current before and after various actions are taken to determine if the system is operating normally.

Unlike the prior art center pivot controller, the present invention includes run relays 310 and 312 instead of a single relay. The use of two low-cost relays allows application processor 308 to individually power each relay and detect if the other relay has failed closed. It is more important to detect if a relay has failed closed than open since a failed closed relay may cause the system to move unexpectedly or not stop.

FIG. 3 illustrates the present invention in the context of a two-wire hot safety. Those familiar with the art will readily understand how the present invention could be used with either a one-wire or neutral safety.

Pivot safety system 316 comprises of tower safety 320 and 322, end tower safety 324, and safety interrupter relay 325. Safety output 314 travels through safety system 316 and returns to pivot controller 306 on safety return 318.

Safety output 314 is tied to the run output from relay 312 and travels through tower safety box 320 and 322. Safety output 314 is connected to safety interrupter relay 326 in the last tower box 324. Safety interrupter relay 326 is controllable by application processor 308.

Safety return 318 originates at safety interrupted relay 326 and travels back through tower boxes 320 and 322. Inside of tower boxes 320 and 322, safety return 318 is connected to a limit switch (not shown) as is commonly found in the prior art. Safety return 318 is connected to the safety detection 328 input for pivot controller 306.

Safety interrupter relay 326 may be controllable by application processor 308 via a wireless connector, power-line communication modem, or any communication means. In a preferred embodiment, relay 326 communicates with application 308 using a wireless transmitter. In an alternative preferred embodiment, relay 326 communicates with application processor 308 using a power-line communication modem.

Those skilled in the art will readily understand that the safety interrupter relay may be placed in the next-to-last tower to achieve the same result as placing in the last tower. In relation to the description of the present invention, the last tower means either the last tower or next-to-last tower.

In the present invention, safety detection 328 input is comprised of a hot safely detection circuit and a neutral safety detection circuit. Safety return 318 is connected to the corresponding safety detection input that matches the safety type on the pivot. The operator of pivot controller 306 specifies in the settings the safety type that pivot controller 306 monitors.

Control signals 330 include a forward, reverse, speed, and end gun output for controlling the operation of the center pivot. In the present invention, the power used to supply control signals 330 first runs through current monitor 304. Application processor 308 monitors the current use before and after changing control signals to detect for failures. For example, when application processor 308 determines that the end gun control signal should be turned on, application processor 308 first measures the current system current. After the current system current is measured, application processor 308 activates the end gun output and then measures the system current again. Depending on the change or no change in the system current, application processor 308 can determine if a fault exists and the likely cause of the fault. Application processor 308 notifies an operator through a user interface of the fault to allow the operator to quickly repair the system. A flow chart detailing the fault detection process is described in conjunction with FIG. 4.

Figure 4:
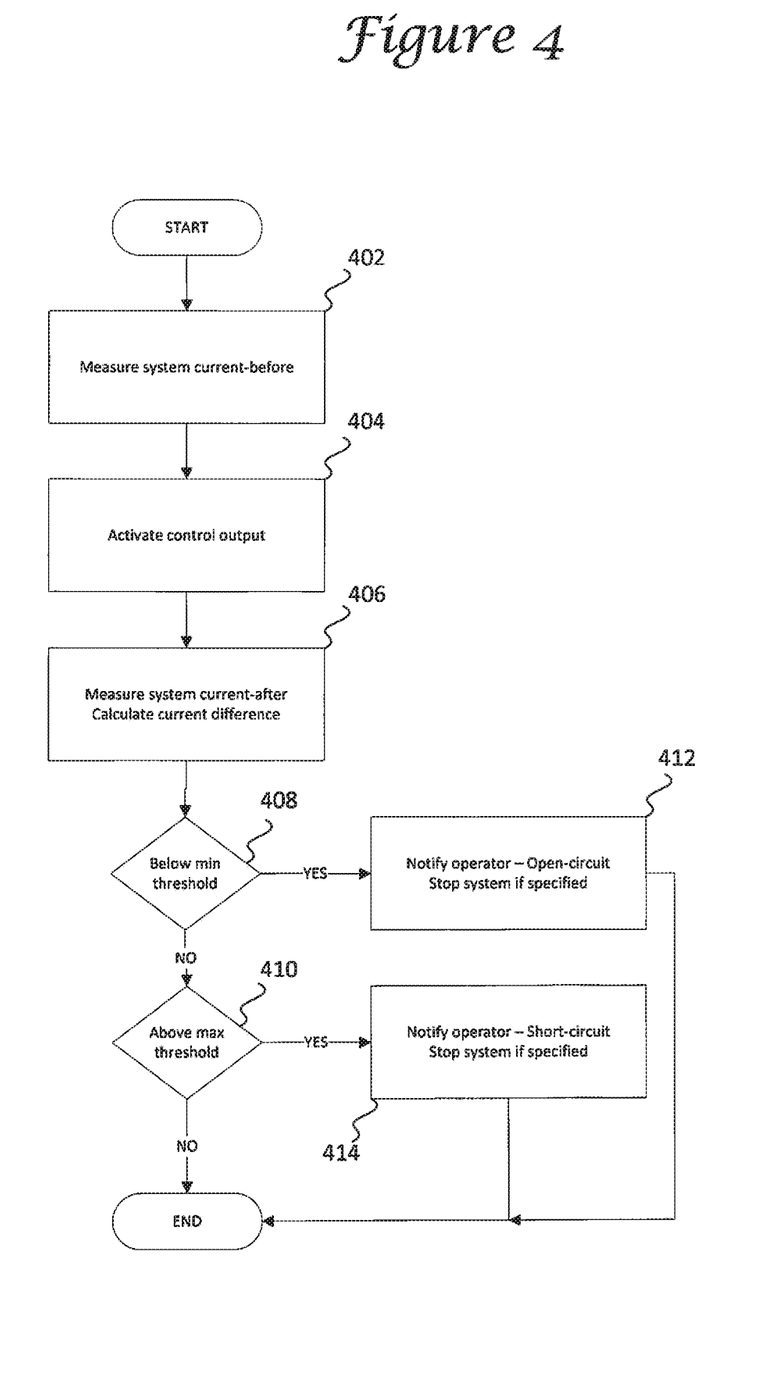
FIG. 4 shows a flow chart for detecting failed contactors for a center pivot controller in accordance with the present invention.

With referenced now to FIG. 4, a flow chart for detecting failed contactors for a center pivot controller in accordance with the present invention. Center pivot systems are long systems that can span up to half a mile in length and contain nearly a dozen locations where control hardware is located. Prior art pivot controls are capable of stopping the system if an abnormal condition is detected; however, the exact cause or the location of the failed hardware is unknown resulting in increased time to locate and correct the fault.

The present invention provides detection capability of the failed hardware by monitoring the current consumption before and after a control circuit is activated. The process begins at step 402 where the controller measures the current system current flow before activating a control output.

At step 404, the controller activates the control output. The control output is any of the control outputs the pivot controller operates, including, forward, reverse, speed, and end gun control.

The process moves to step 406 when the controller measures the current after the control is activated and calculates a current difference. In a preferred embodiment, the controller waits a specified period of time after the control is activated before measuring the current to allow the system current to settle.

At step 408, the controller compares the current difference to a minimum current threshold. The minimum current threshold is the smallest amount of current that the control circuit should consume. A reading below the minimum current threshold represents an open-circuit wherein the control circuit is not consuming an expected amount of current, which would typically happen when a control contactor coil fails open.

If the current difference from step 406 exceeds the minimum current threshold at step 408, the process advances to step 410. At step 410 the current difference is compared to a maximum current threshold. The maximum current threshold represents an amount of current that would indicate a short-circuit or unusually high current draw on the control circuit. If the current difference from step 406 is below the maximum threshold, the control circuit is operating correctly and verification process is terminated.

At step 408, if the measured current is below the minimum threshold, the process advances to step 412 where the operator is notified that the control circuit being checked has an open-circuit. In a preferred embodiment, the controller includes a setting that allow the controller to stop the pivot if an open-circuit is detected on the control circuit being checked.

At step 410, if the measured current exceeds the maximum threshold, the process moves to step 414 where the operator is notified that the control circuit being checked has a short-circuit. In a preferred embodiment, the controller includes a setting that allows the controller to stop the pivot if a short-circuit is detected on the control circuit being checked.

Most center pivots contain a fuse rated at 5 amps; however, due to the length of the system, some short circuits will not trip the system fuse and the system will continue to operate in an abnormal condition. The present invention addresses the issue of both short-circuits and open-circuits by measuring the control line current and notifying the user and stopping the system. One further advantage of the present invention is the system operator is notified of the cause of the system fault, which reduces time to locate and repair the fault.

Figure 5:
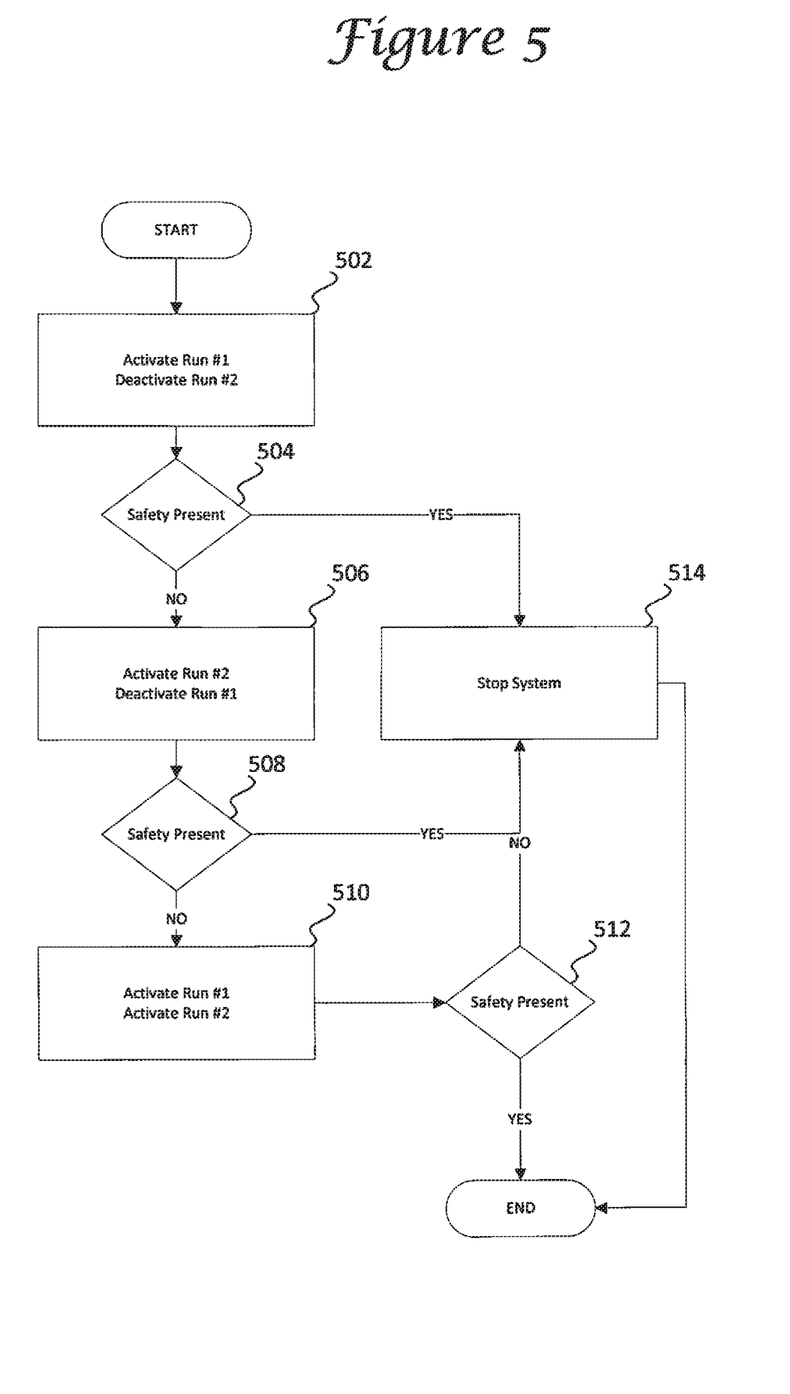
FIG. 5 illustrates a flow chart for determining if the run control relays are operating correctly for a center pivot controller in accordance with the present invention.

With referenced now to FIG. 5, a flow chart for determining if the run control relays are operating correctly for a center pivot controller in accordance with the present invention. Pivot controllers utilize relays to activate control circuits in a pivot. Due to the harsh conditions center pivots operate those relays are subject to failure. A control relay may fail in an open state or a closed state. If the relay fails open, the control circuit will never operate. If the relay fails closed, then the control circuit will always try to operate. Those familiar with the art appreciate the dangers of a control relay failing closed since the system may move unexpectedly and without the benefit of a safety circuit.

Prior art attempts to address this problem involve using expensive relays with higher reliability than standard relays. However, any type of relay is subject to failure. The present invention solves the issue of a failed closed control relay by using two standard relays in series and having the pivot controller activate them in a pattern to detect any abnormal results. The benefits of the present invention is that it uses low cost relays and can detect a failed control relay prior to the system becoming unsafe to operate.

In a preferred embodiment, two control relays are used in series. Those skilled in the art will appreciate that any number of relays greater than one may be utilized to achieve the same result. The process described in conjunction with FIG. 5 illustrates how a preferred embodiment with two relays functions.

The process begins at step 502 where the pivot control activates run relay 1 and deactivates run relay 2. At step 504, the pivot controller detects is a safety return signal is present. At this stage, there should be no safety return signal because both relays are not activated. If at step 504, a safety return is detected, the process advances to step 514 where the system is stopped and the operator is notified that run relay 2 has failed closed.

At step 504, if no safety is detected, then run relay 1 is deactivated and run relay 2 is activated. The process advances to step 508 where the safety return is checked again, similar to step 504. If the safety signal is present, the process advances to step 514 where the system is stopped and the operator is notified that run relay 1 has failed closed.

If no safety return is detected at step 508, the pivot controller activates both run relay 1 and run relay 2 at step 510. The safety return is measured again at step 512. If he safety return is present, the system is safe to operate. If the safety return is not present, the system is stopped at step 514.

Figure 6:
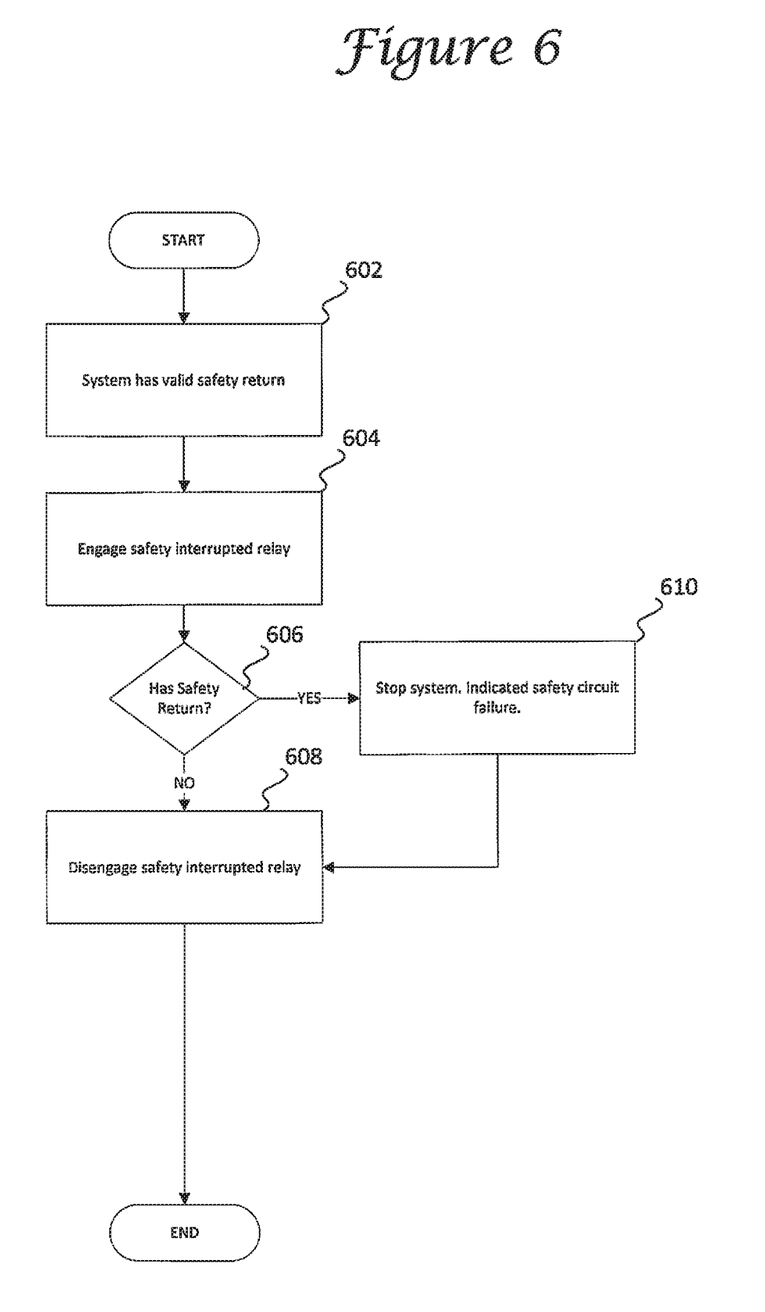
FIG. 6 depicts a flow chart for verifying the safety circuit for a center pivot controller in accordance with the present invention.

With referenced now to FIG. 6, a flow chart for verifying the safety circuit for a center pivot controller in accordance with the present invention. One of the most common causes for a wrecked center pivot is a failed safety circuit. A safety circuit may fail from a variety of reasons, including water penetration, failed switches, and human wiring error. Prior art pivot controllers only stop a system if the safety circuit return is absent and no checking is done to verify that the safety circuit is functional at all towers in the pivot.

The present invention addresses the shortcomings of prior art pivot controllers by added a remotely controllable safety interrupter relay (Relay 326) at the end of the system where the safety return originates. Those skilled in the art will recognize that if the safety can be interrupted at the end of the system, that any intermediate tower should be able to interrupt the safety circuit. Further, if the safety circuit can be opened from the end of the system, the safety circuit wiring can be deemed operational with a much higher degree of confidence.

The process begins at step 602 with the system having a valid safety returned being monitored by application processor 308. At step 604, application processor 308 engages safety interrupter relay (Relay 326) to open the safety circuit at the end of the system.

Application processor 308 reads the safety return circuit at step 606. At this step, if the safety circuit is not being shorted or bypassed before the last tower, application processor 308 should read an open safety return. If at step 606, application processor 308 detects a safety return the process advances to step 610. At step 610, the system is stopped and the operator is notified that the safety circuit is being bypassed. The process then advances to step 608.

At step 606, if the safety return is being interrupted, the process advances to step 608. If the system safety was valid at step 602 and the act of interrupting the safety at step 604 was effective, the pivot controller determines the pivot safety system is operating correctly.

At step 608, the safety interrupter relay is disengaged and the safety return signal should be present again for application processor 308.

In a preferred embodiment, application processor 308 verifies the safety circuit when starting and periodically while operating. Those skilled in the art will recognize that periodically verifying the safety circuit during operation may detect shorts on the safety circuit caused by the collector ring at the system base.

While the invention has been particularly shown and described with reference to preferred embodiments, it will be understood by those skilled in the art that various changes in form and detail may be made therein without departing from the spirit and scope of the invention. Any variations, modifications, additions, and improvements to the embodiments described are possible and may fall within the scope of the invention as detailed within the following claims.

What is claimed is:

1. A pivot controller for controlling a center pivot, said pivot controller comprising:
    an end tower safety interrupter relay,
    a safety detection circuit,
    an application processor with instructions for:
        reading the safety detection circuit;
        activating the end tower safety interrupter relay;
        deactivating the end tower safety interrupter relay; and
        detecting a failed safety circuit, wherein said instructions for detecting the failed safety circuit comprise the steps of:
            setting the center pivot to a run state;
            activating the end tower safety interrupter relay;
            reading the safety detection circuit; and
            deactivating the end tower safety interrupter relay.
2. The pivot controller from claim 1, wherein:
    said instructions for detecting the failed safety circuit are executed periodically while said center pivot is in the run state.

* * * * *